US012663105B2

(12) United States Patent
Root

(10) Patent No.: US 12,663,105 B2
(45) Date of Patent: Jun. 23, 2026

(54) UNIVERSAL NUT WITH THREAD ADAPTER

(71) Applicant: BrassCraft Manufacturing Company, Novi, MI (US)

(72) Inventor: Jeffrey T. Root, Howell, MI (US)

(73) Assignee: BrassCraft Manufacturing Company, Novi, MI (US)

( * ) Notice: Subject to any disclaimer, the term of this patent is extended or adjusted under 35 U.S.C. 154(b) by 644 days.

(21) Appl. No.: 18/066,360

(22) Filed: Dec. 15, 2022

(65) Prior Publication Data

US 2023/0194026 A1      Jun. 22, 2023

Related U.S. Application Data

(60) Provisional application No. 63/291,584, filed on Dec. 20, 2021.

(51) Int. Cl.
*F16L 19/02* (2006.01)

(52) U.S. Cl.
CPC ................................ *F16L 19/0237* (2013.01)

(58) Field of Classification Search
CPC ............................ F16L 19/0237; F16L 13/141
See application file for complete search history.

(56) References Cited

U.S. PATENT DOCUMENTS

| | | | |
|---|---|---|---|
| 1,433,381 A | 10/1922 | Kirkpatrick | |
| 1,635,961 A | 7/1927 | Edward | |
| 1,797,194 A | 3/1931 | Knapp | |

| | | | | |
|---|---|---|---|---|
| 2,101,451 A | * | 12/1937 | Protin | .................... B65D 59/06 |
| | | | | 138/96 T |
| 2,452,908 A | | 11/1948 | Irving | |
| 2,685,466 A | | 8/1954 | Middelton | |
| 3,295,872 A | * | 1/1967 | Kragle | ..................... H01R 9/05 |
| | | | | 439/841 |
| 3,929,317 A | | 12/1975 | Cohn et al. | |
| 4,249,426 A | | 2/1981 | Erikson et al. | |
| 4,565,350 A | | 1/1986 | Rozek | |
| 4,589,688 A | * | 5/1986 | Johnson | .............. F16L 19/0206 |
| | | | | 285/341 |
| 4,593,430 A | | 6/1986 | Spangler et al. | |
| 4,683,610 A | | 8/1987 | Richards et al. | |
| 4,722,634 A | | 2/1988 | Malish | |
| 4,794,945 A | | 1/1989 | Reback | |
| 5,025,826 A | | 6/1991 | Schoepe et al. | |
| 5,027,671 A | | 7/1991 | Erikson et al. | |
| 5,216,781 A | | 6/1993 | Brondfield | |

(Continued)

OTHER PUBLICATIONS

Helicoil Plus Thread Technology for high-strength fastenings, Bollhoff Group, 56 pages.

(Continued)

*Primary Examiner* — James M Hewitt, II
(74) *Attorney, Agent, or Firm* — Reising Ethington P.C.

(57) ABSTRACT

A universal nut includes at least one shell including a base wall and a skirt extending axially away from the base wall and having an internal thread, and a thread adapter threaded to the internal thread of the skirt of the at least one shell. A universal fluid connector includes the universal nut, and a conduit extending along a conduit axis and including a tubing portion and a nut coupling portion. The base wall of the at least one shell couples to the nut coupling portion of the conduit and has a conduit aperture through which the conduit extends.

22 Claims, 9 Drawing Sheets

(56)         References Cited

U.S. PATENT DOCUMENTS

| | | | | |
|---|---|---|---|---|
| 5,364,135 | A | * | 11/1994 | Anderson ........... F16L 19/0212 |
| | | | | 285/38 |
| 6,059,261 | A | | 5/2000 | Han |
| 6,059,451 | A | * | 5/2000 | Scott .............. G01R 31/318378 |
| | | | | 714/733 |
| 6,178,981 | B1 | | 1/2001 | Wales |
| 7,347,458 | B2 | * | 3/2008 | Rome ................. A61M 39/105 |
| | | | | 285/85 |
| 7,437,857 | B1 | | 10/2008 | Maguire et al. |
| 7,987,869 | B2 | | 8/2011 | Rosko et al. |
| 8,266,767 | B1 | | 9/2012 | Huang |
| 9,255,387 | B2 | | 2/2016 | Yang et al. |
| 9,334,636 | B1 | | 5/2016 | Finegan, Jr. |
| 10,450,730 | B2 | | 10/2019 | Byron |
| 11,332,913 | B2 | | 5/2022 | Byron |
| 2002/0172548 | A1 | | 11/2002 | Chang |
| 2005/0099008 | A1 | | 5/2005 | Glover |
| 2009/0097940 | A1 | * | 4/2009 | Campau .................. F16B 37/12 |
| | | | | 411/262 |
| 2010/0140530 | A1 | | 6/2010 | Robison |
| 2011/0180155 | A1 | | 7/2011 | Shantzis |
| 2016/0201304 | A1 | | 7/2016 | Doss et al. |

OTHER PUBLICATIONS

Mexican Office Action corresponding to application MX/a/2022/016298, dated Nov. 27, 2025, 7 pages.

* cited by examiner

UNIVERSAL NUT WITH THREAD ADAPTER

TECHNICAL FIELD

This disclosure relates generally to fasteners and, more particularly, to nut fasteners for universal fluid connectors.

BACKGROUND

Fasteners, such as nuts and bolts, are ubiquitous in industry. And some fasteners are adapted for use with rotatable couplings, which are used for coupling pipes, tubes, electrical components, and various other products for various applications. In a general plumbing example, a fluid connector includes a tube with an open end, a barbed connector with a barbed cylinder interference fit in the open end of the tube and a seal flange extending radially outwardly from the cylinder. The fluid connector also includes a ferrule crimped around the open end of the tube to the barbed connector, and a threaded nut having a base wall trapped between the ferrule and the seal flange of the barbed connector and a skirt extending away from the base wall and having interior threads for threading to another component to which the tube is to be coupled. In a particular plumbing example, a fluid coupling includes a nut assembly including a plastic nut and a plastic outer shell rotatably carried around the nut. To accommodate different sizes of components to which the nut may be threaded, the nut assembly also may include an axially continuous, solid cylindrical adapter sleeve having external threads threaded to the nut and having internal threads. Such products are commercially successful, but still have room for improvement.

SUMMARY

A universal nut includes at least one shell including a base wall and a skirt extending axially away from the base wall and having an internal thread, and a thread adapter threaded to the internal thread of the skirt of the at least one shell. A universal fluid connector includes the universal nut, and a conduit extending along a conduit axis and including a tubing portion and a nut coupling portion. The base wall of the at least one shell couples to the nut coupling portion of the conduit and has a conduit aperture through which the conduit extends.

Figures 1, 2:
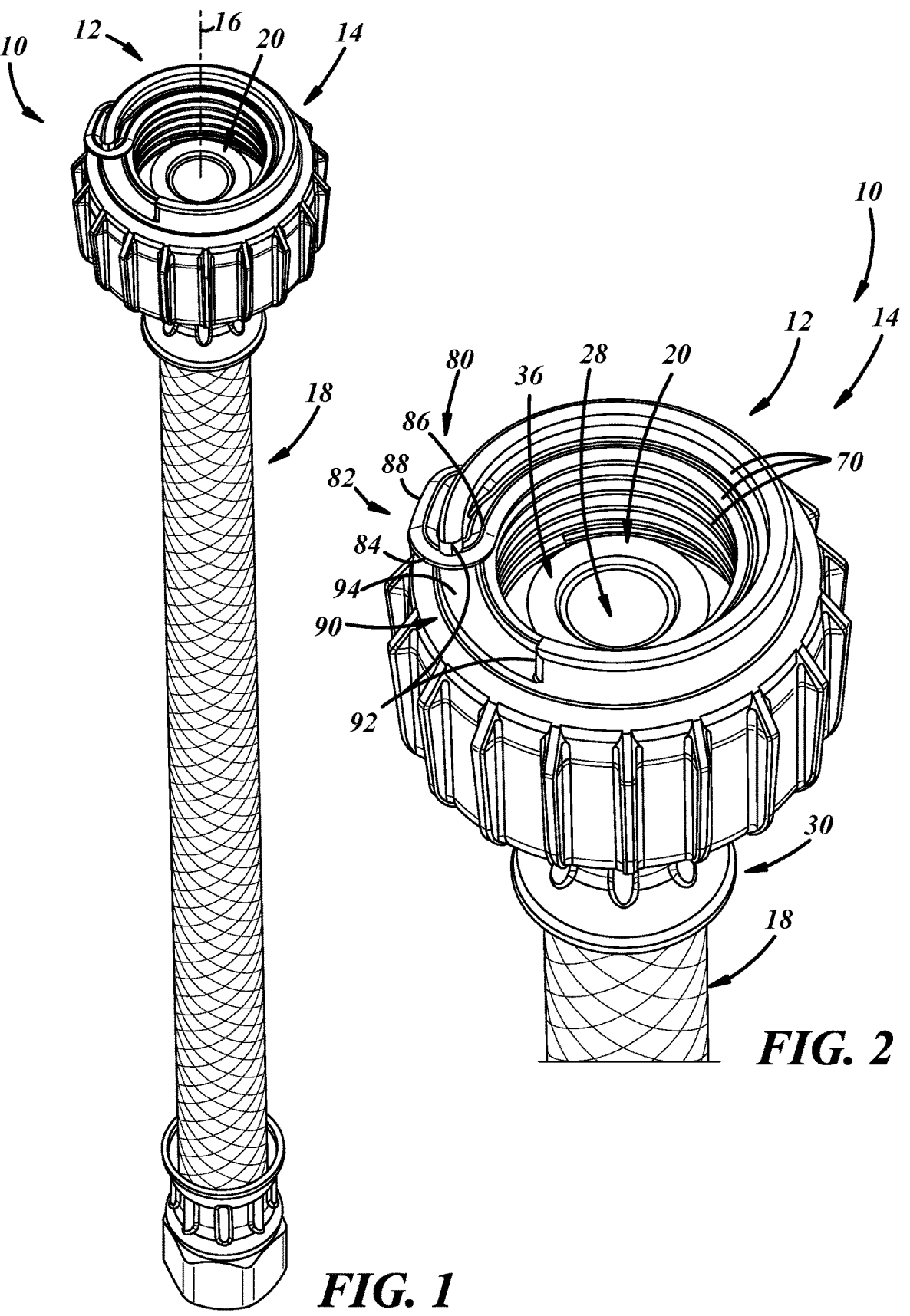
FIG. 1 is a perspective view according to an illustrative embodiment of a torque-limiting universal nut including a thread adapter and as applied to a first plumbing product including a braided hose, a barb and seal hose connector, and a ferrule crimped around the braided hose to the connector.
FIG. 2 is an enlarged, fragmentary, perspective view of the first plumbing product having the torque-limiting universal nut of FIG. 1.
Figures 6, 7, 8:
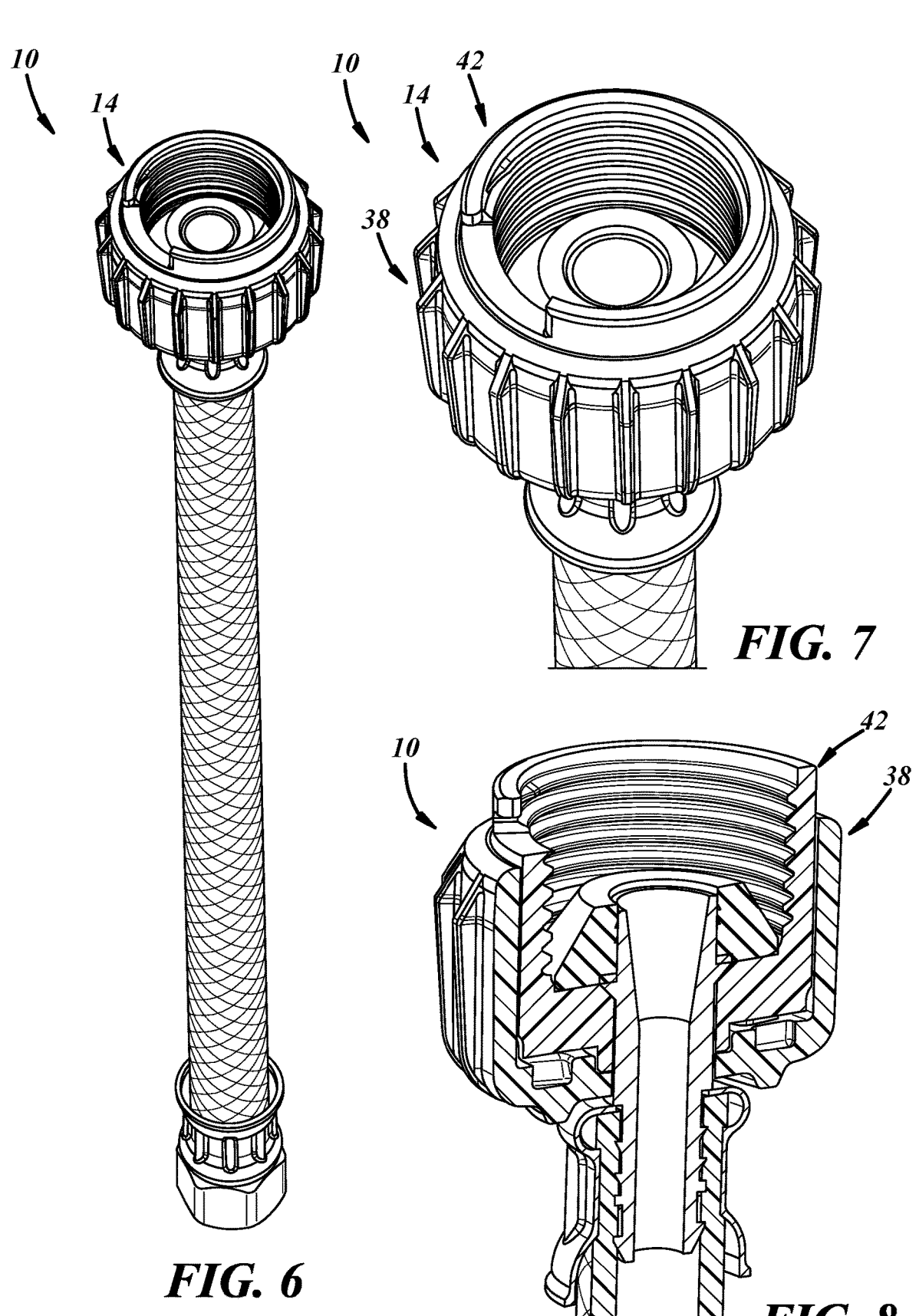
FIG. 6 is a perspective view according to an illustrative embodiment of the torque-limiting universal nut of FIG. 1 without the thread adapter of FIG. 1 and as applied to the first plumbing product of FIG. 1.
Figures 9, 10:
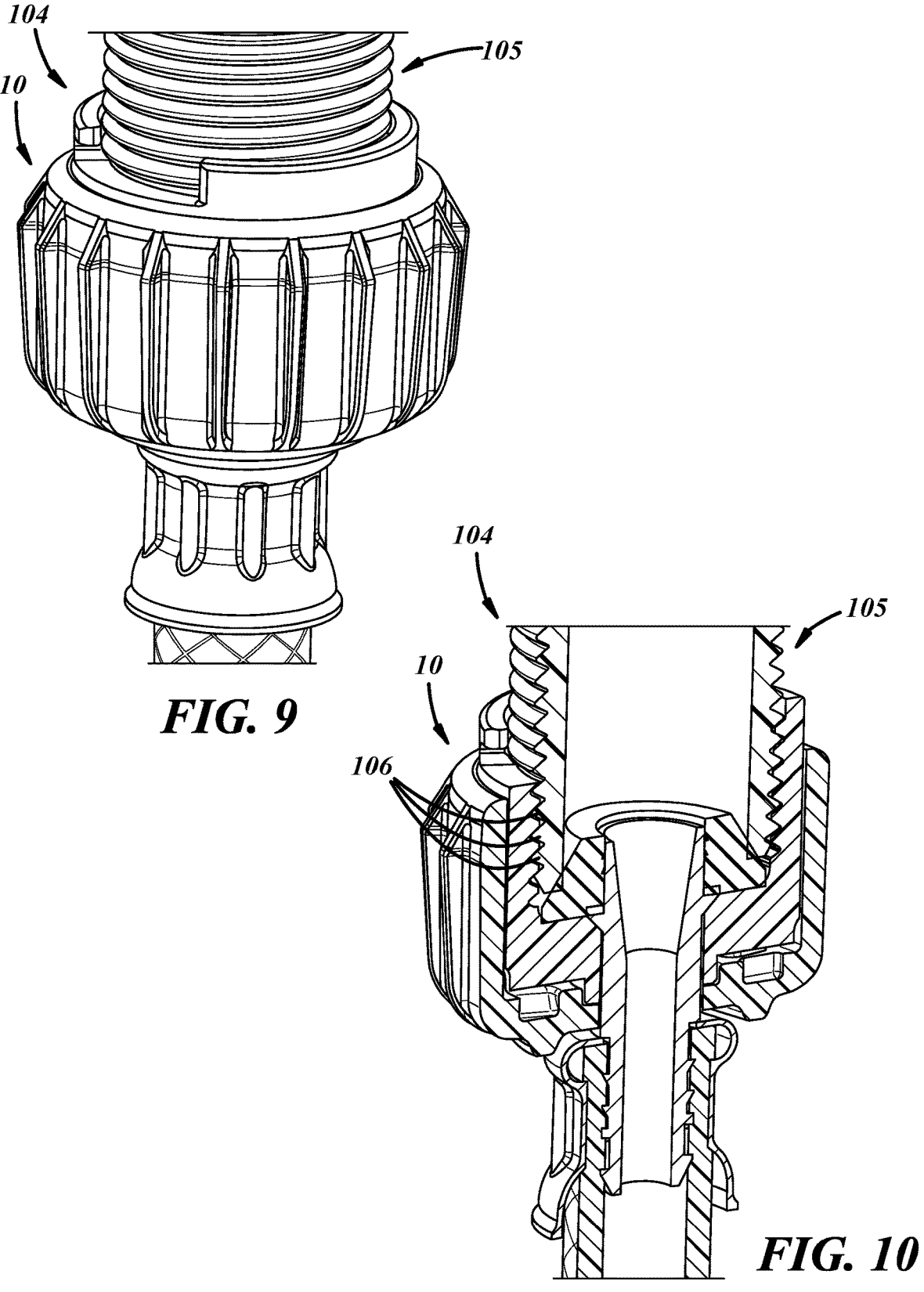
Figures 11, 12:
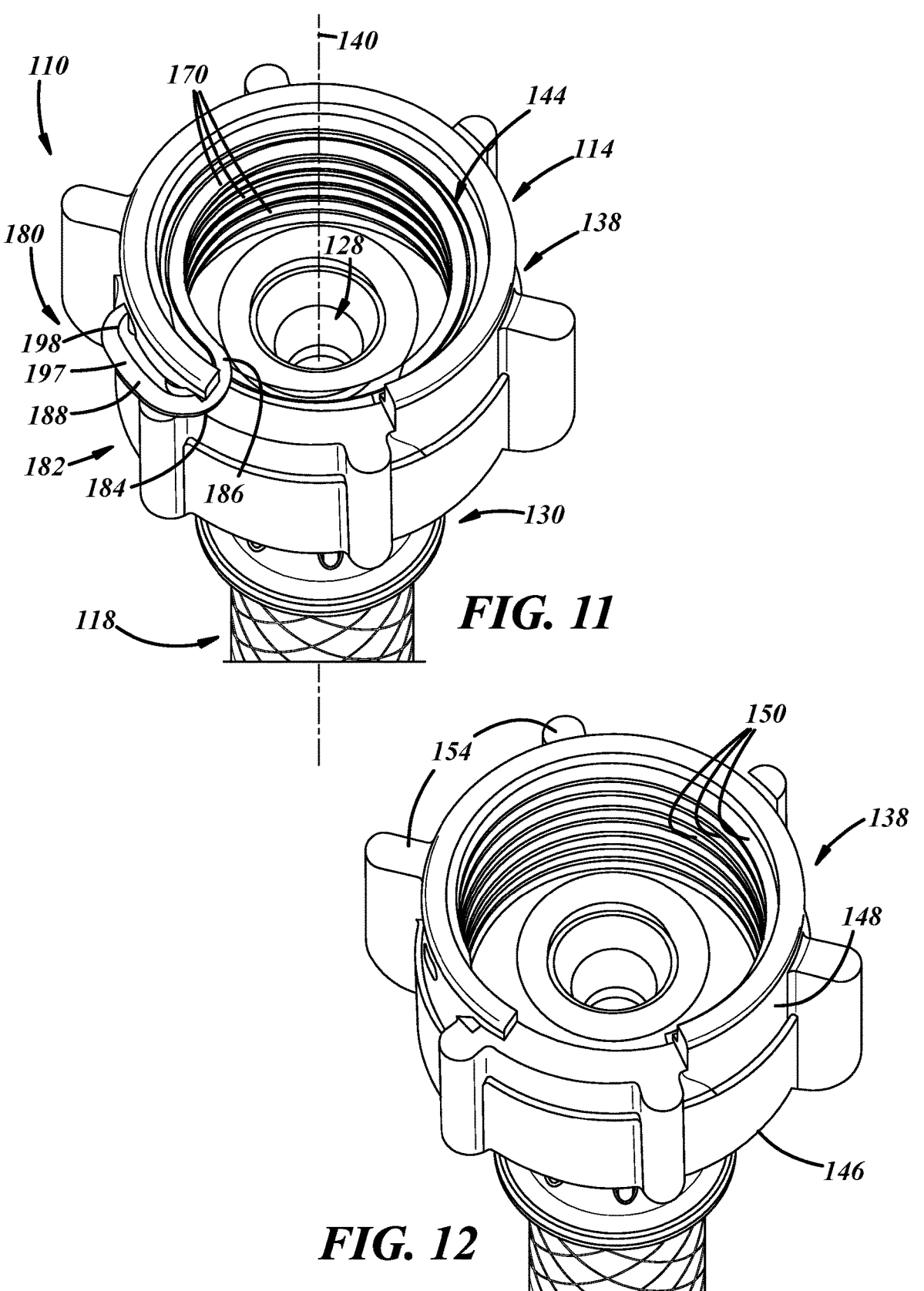
Figures 13, 14:
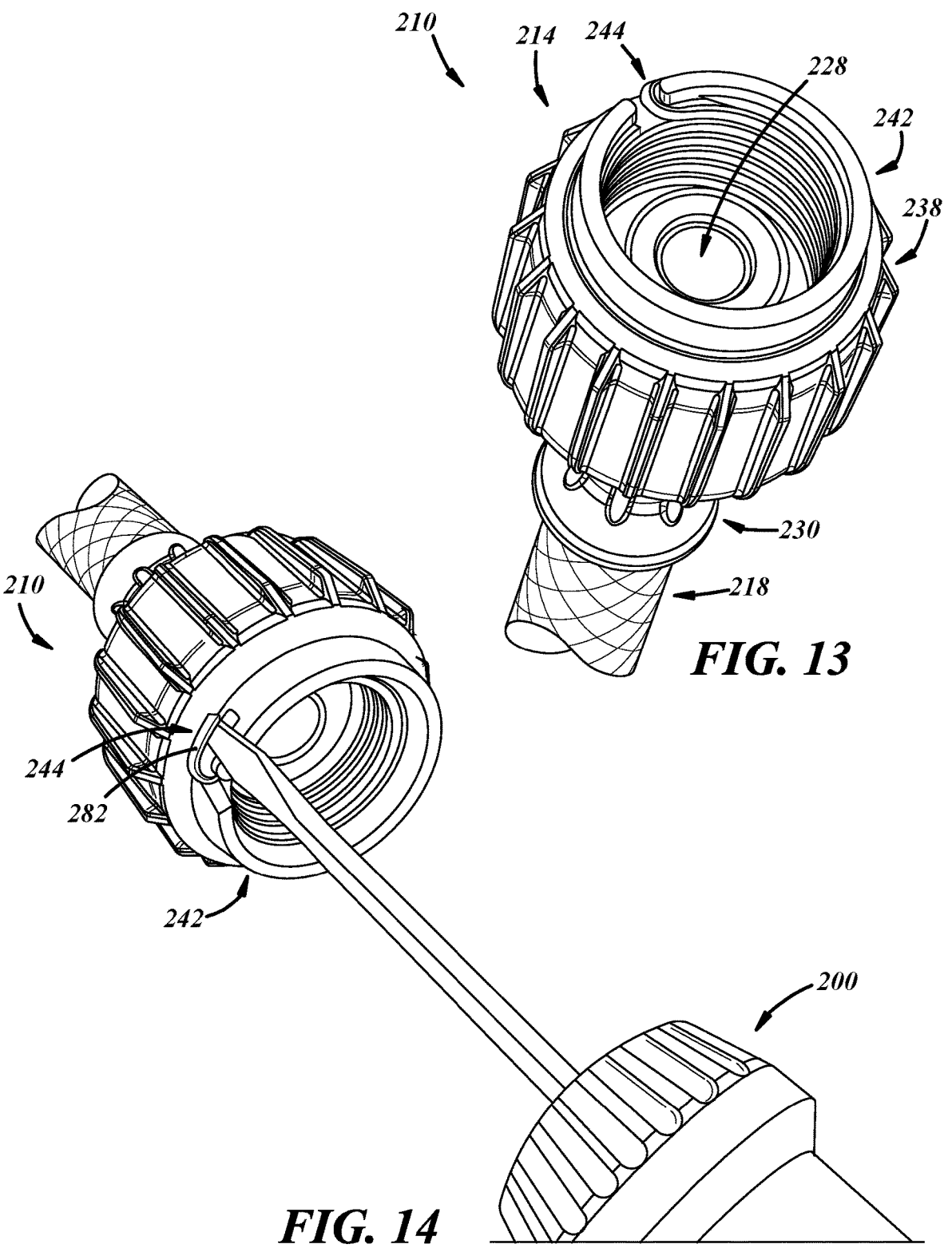
Figures 15, 16:
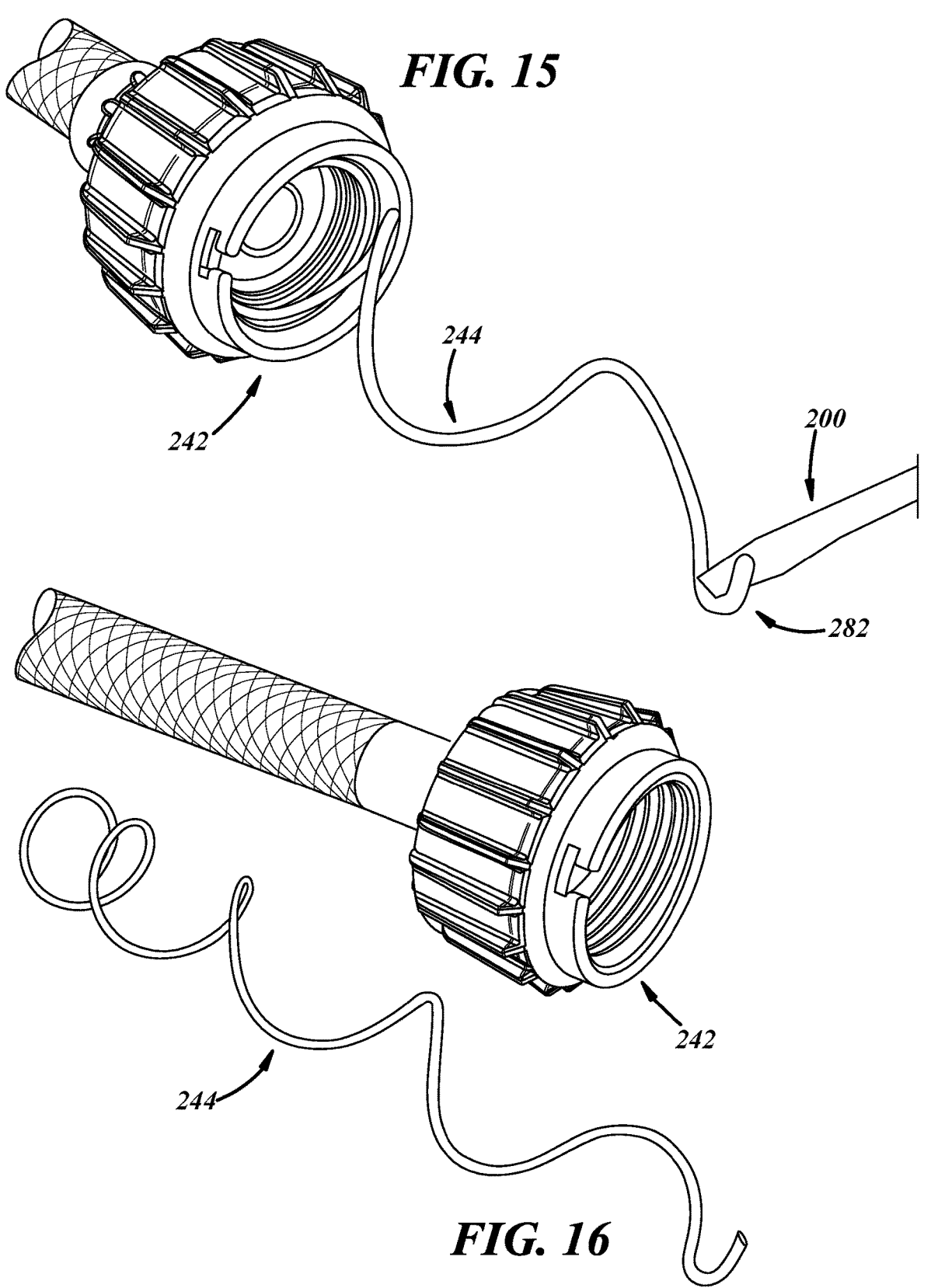
Figures 17, 18:
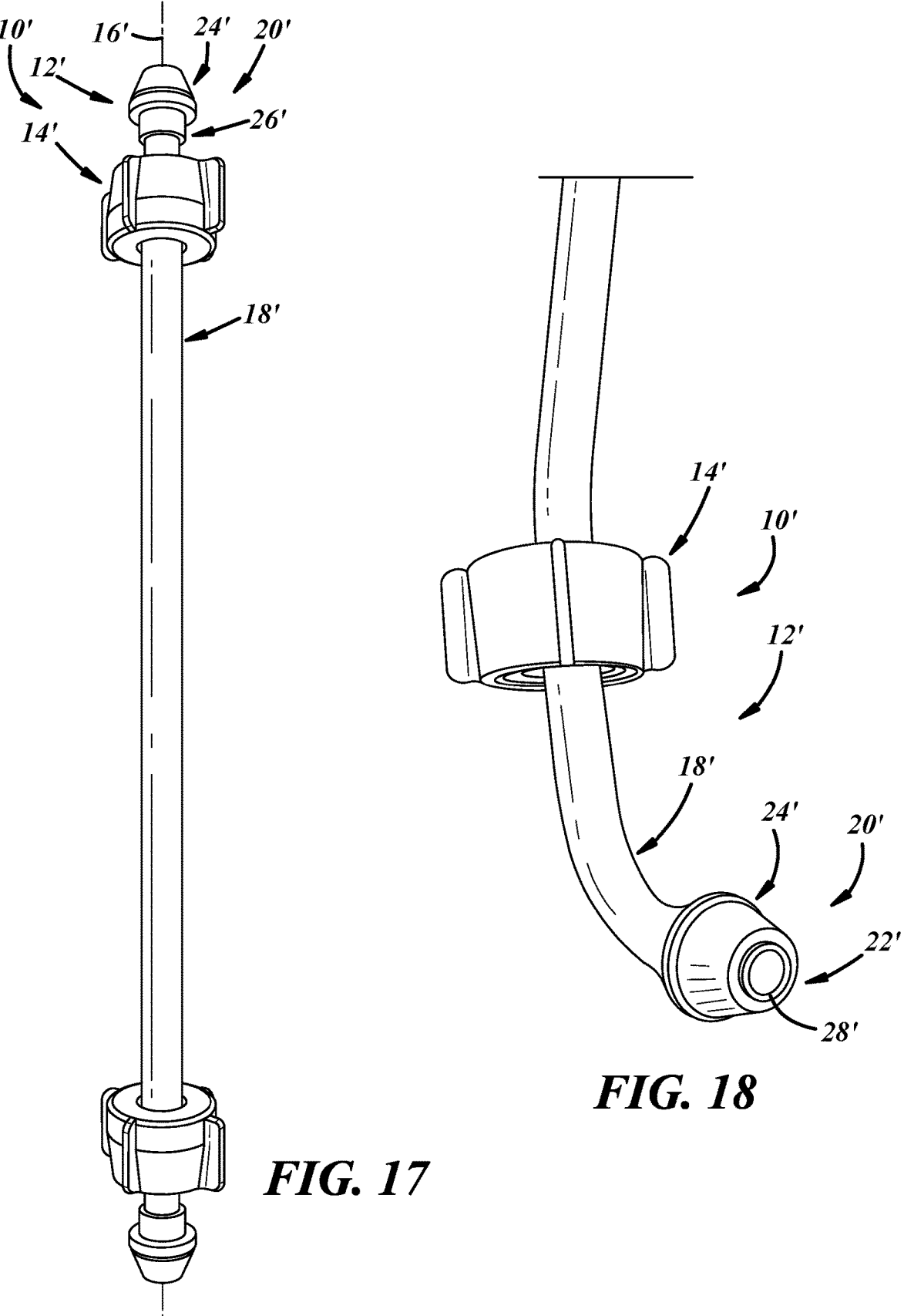

FIG. 7 is an enlarged, fragmentary, perspective view of the first plumbing product of FIG. 1 without the thread adapter of FIG. 1;

FIG. 8 is a perspective, longitudinal cross-sectional view of the first plumbing product shown in FIG. 7;

FIG. 9 is an enlarged, fragmentary, perspective view of a second fluid coupling assembly including the first plumbing product shown in FIG. 6 and a third plumbing product threaded to the first plumbing product shown in FIG. 6;

FIG. 10 is a perspective, longitudinal cross-sectional view of the second fluid coupling assembly shown in FIG. 9;

FIG. 11 is a fragmentary perspective view of an illustrative embodiment of a universal nut including a thread adapter and as applied to a plumbing product;

FIG. 12 is a perspective view according to the universal nut of FIG. 11 without the thread adapter of FIG. 11 and as applied to the plumbing product of FIG. 11;

FIG. 13 is a fragmentary perspective view of a further illustrative embodiment of a torque-limiting universal nut including a thread adapter and as applied to a plumbing product;

FIG. 14 is a fragmentary perspective view of the torque-limiting universal nut of FIG. 13, wherein a hook of the thread adapter is engaged with a tip of a flat-blade screwdriver;

FIG. 15 is a fragmentary perspective view of the torque-limiting universal nut and the screwdriver shown in FIG. 14, wherein the thread adapter is being pulled out of and uncoiling from a driven shell of the torque-limiting universal nut;

FIG. 16 is a fragmentary perspective view of the torque-limiting universal nut shown in FIG. 15, wherein the thread adapter has been uncoiled and completely removed from the torque-limiting universal nut;

FIG. 17 is a perspective view of an illustrative embodiment of a universal fluid connector in the form of a plumbing product including a conduit and universal nuts circumscribing the conduit; and FIG. 18 is an enlarged, fragmentary, perspective view of the connector of FIG. 17.

DETAILED DESCRIPTION

In general, a universal nut and a universal fluid connector will be described using one or more examples of illustrative embodiments of a rotatable coupling plumbing product such as a faucet connector and/or a toilet connector. The example embodiments will be described with reference to use in the plumbing industry. However, it will be appreciated as the description proceeds that the claimed subject matter is useful in many different applications and may be implemented in many other embodiments. In this regard, and as used herein and in the claims, it will be understood that the claimed universal nut and universal fluid connector refers not only to plumbing applications, but also to other applications, including petroleum connectors, medical device connectors, and any other applications suitable for use with a universal nut or a universal fluid connector.

Figure 3:
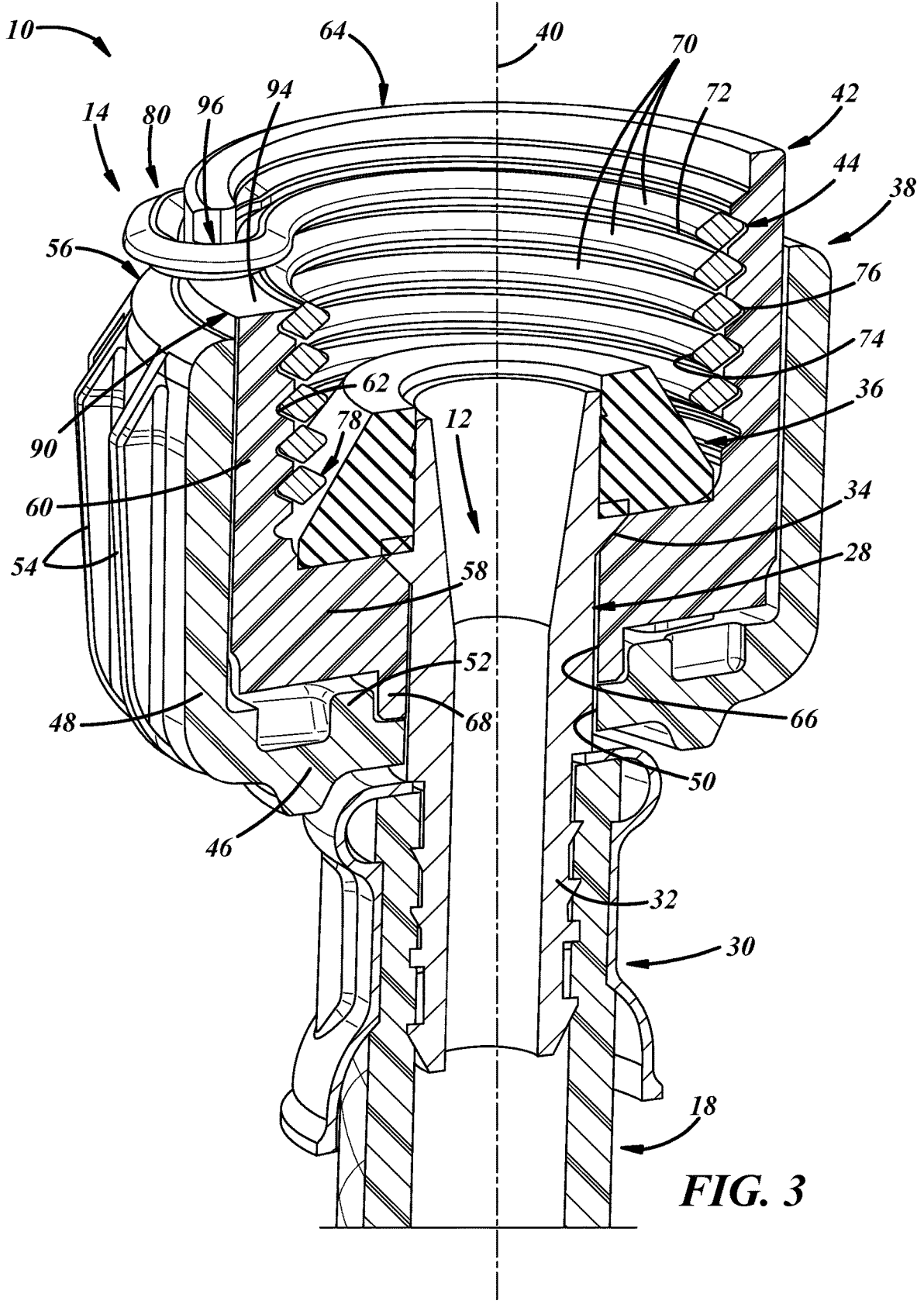
FIG. 3 is a further enlarged, perspective, longitudinal, cross-sectional view of the first plumbing product shown in FIG. 2.

With reference now to FIGS. 1 through 3, an illustrative embodiment of a universal fluid connector 10 is shown and includes a conduit 12 and a nut 14 circumscribing the conduit 12. The conduit 12 extends along a conduit axis 16 and includes a tubing portion and a nut coupling portion 20. In this embodiment, as shown in FIGS. 2 and 3, the tubing portion may be a braided hose 18, and the nut coupling portion 20 may include a hose connector that may be a barb and seal connector 28, wherein the universal nut 14 is trapped between the hose 18 and the barb and seal connector 28. In this embodiment, FIGS. 2 and 3 also show the conduit 12 includes a ferrule 30 crimped around the hose 18 to the connector 28. FIG. 3 shows the barb and seal connector 28 may include a cylinder 32 fit to the open end of the hose 18 with an obliquely angled shoulder 34 to retain the nut 14, and a seal 36 coupled to the cylinder 32. The seal 36 may be a frustoconical seal as best shown in FIG. 3.

With continued reference to FIG. 3, the universal nut 14 may be a torque-limiting universal nut that includes a drive shell 38 rotatable about a central longitudinal axis 40, a driven nut or shell 42 configured to be carried in and driven by the drive shell 38, and a thread insert or adapter 44 carried by the driven shell 42. As will be described in greater detail below, the universal fluid connector 10 includes a novel arrangement using the thread adapter 44 as a size adapter that may provide improved functionality and durability compared to prior universal fluid connectors.

The drive shell 38, with continued reference to FIG. 3, may be of any suitable construction and composition. For example, the drive shell 38 may be molded from polymeric material, for instance, polypropylene or glass filled polypropylene. Or, the drive shell 38 may be manufactured from any other material and in any other manner suitable for use with universal fluid connectors.

In FIG. 3, the drive shell 38 carries the driven shell 42 and basically includes a drive shell base wall 46, and a drive shell skirt 48 extending axially away from the drive shell base wall 46. The drive shell base wall 46 has an interior side, and a drive shell aperture 50 therethrough. The drive shell 38 also may include a hub 52 extending axially inwardly from the base wall 46 and circumscribing the drive shell aperture 50 and having an internal diameter. Also, the drive shell skirt 48 may include knurling 54 on an exterior thereof, for example, for enhanced grip by a user. The drive shell skirt 48 may include one or more internal radial drive elements carried thereon for torque-limited driving of the driven shell 42. Also, the drive shell skirt 48 is cylindrical and terminates in a drive shell axially outer end 56.

The driven shell 42, with continued reference to FIG. 3, may be of any suitable construction and composition. For example, the driven shell 42 may be molded from polymeric material, for instance, glass filled polypropylene. Or, the driven shell 42 may be manufactured from any other material and in any other manner suitable for use with universal fluid connectors.

In FIG. 3, the driven shell 42 includes a base wall 58, and a radially outer wall extending axially away from the base wall 58. In this embodiment, the radially outer wall is a skirt 60 that extends integrally from the base wall 58 and carries an internal thread 62. As used herein, the term "thread" includes one or more threads or thread segments. In any case, the skirt 60 may be cylindrical and may terminate in a driven shell axially outer end 64. The driven shell 42 may include external radial driven elements carried thereon that cooperate with the corresponding drive elements of the drive shell 38. The drive and driven elements may be radially, circumferentially, and/or axially extending features, and may or may not be used with a separate clutch element between the drive and driven shells. The base wall 58 includes a nut aperture 66, and a hub 68 extending axially outwardly from the base wall 58 and establishing the driven shell aperture 66 via an internal diameter of the hub 68.

The thread adapter 44, with continued reference to FIG. 3, may be of any suitable construction and composition. For example, the thread adapter 44 may be helically shaped and wound from a strip of metal, for instance, brass or stainless steel, or pultruded or molded from a polymeric material, for instance, polypropylene. In one example, a brass thread adapter may be used with a torque-limiting nut assembly and, in another example, a stainless steel thread adapter may be used with a standard nut assembly. In yet another example, a continuous-fiber-reinforced polypropylene polymer thread adapter may be used with a torque limiting nut assembly. One of ordinary skill in the art will appreciate that the thread adapter 44 may be manufactured from any other material and in any other manner suitable for use with producing thread adapters.

In any case, the thread adapter 44 is threaded to the internal thread 62 of the driven shell 42. As introduced above, the thread adapter 44 may be elastically resilient, for example, spring-like, in that the adapter can compress when installed into a female thread. As shown in FIG. 3, the thread adapter 44 may include a single strip of material having a plurality of helical convolutions 70 unconnected at axially adjacent edges 72 thereof. Accordingly, the adapter 44 is axially discontinuous. The single strip of material may be of rhombic, or rhombus-shaped, in cross section, as shown. The thread adapter 44 includes inner and outer circumferences 74, 76 and may include an axially inboard end 78 terminating within the inner and outer circumferences 74, 76. The adapter also may include an axially outboard end 80 terminating outside of the outer circumference 76. As best shown in FIG. 2, the axially outboard end 80 may include a hook 82 that may extend radially outwardly, and may include a bight portion 84, a connecting portion 86 connecting the bight portion 84 to a first of the plurality of helical convolutions 70, and a free portion 88 extending away from the bight portion 84 and spaced radially outwardly from the plurality of helical convolutions 70.

The thread adapter 44 also includes an uninstalled pitch and pitch diameter. In embodiments, it may be beneficial for the uninstalled pitch diameter to be larger than the corresponding pitch diameter of the internal thread 62 of the driven shell 42, but sized so that only elastic deformation of the adapter 44 is required to compress the thread adapter 44 upon its installation in the driven shell 42. As such, the thread adapter 44 presents a resultant spring force which will cause it to tend to expand until it seats into the internal thread 62 of the driven shell 42. The resultant spring force of the thread adapter 44 is beneficial for maintaining contact with the internal thread 62 and establishing a desired installed pitch and pitch diameter of the thread adapter 44 upon assembly. The resultant spring force of the thread adapter 44 may be affected by plastic creep if the thread adapter is made of a polymeric material. In some instances, creep may cause the resultant spring force to drop to zero which may result in deformation of the thread adapter 44 to the point where the thread adapter 44 no longer adequately engages the mating part (e.g., a plumbing product).

Thermoplastic material creep resistance may be improved by adding long and/or continuous length reinforcement fibers, such as glass fibers, to polypropylene. Long fiber reinforced thermoplastics tend to be stronger and resist creep more effectively when compared to typical virgin or short fiber reinforced polymers. One example of a long fiber reinforced polymer comprising these beneficial properties includes polymeric pellets that are compatible with injection molding machines and contain fibers that are as long as the pellets. Typically, the length of the fibers may range from 6 mm to 10 mm, including all ranges, sub-ranges, endpoints, and values of that range, and may vary in concentration by weight between 20% and 60% including all ranges, sub-ranges, endpoints, and values of that range. It is common for fibers to break down during the injection molding process, however, the enhanced material properties mentioned above may still be obtained if the final molded product comprises fibers that are longer than a pre-defined critical length. As defined in the plastic molding industry, an example critical length is the length of the fiber required so that a plastic bond can transfer a load between the plastic and the fiber that is equal to the tensile strength of the fiber. Under ultimate loads, fibers shorter than the critical length may fail by pulling out of the plastic matrix while fibers longer than the critical length may fail by shearing off of the fiber. When the thread adapter 44 is made of molded polypropylene, it is beneficial for the long fibers in the final molded product to include at least some fibers that are longer than 3.1 mm, which is the critical length for glass fibers in polypropylene. Likewise, it may be beneficial for the long fibers in the final molded product to include a majority of the fibers longer than 3.1 mm.

With reference again to FIG. 3, the drive shell base wall 46 of the drive shell 38 and the driven shell base wall 58 of the driven shell 42 may be axially trapped between the ferrule 30 and the shoulder 34 of the barbed connector 28. Also, the driven shell axially outer end 64 may extend axially beyond the drive shell axially outer end 56 when the driven shell 42 is assembled to the drive shell 38 as shown. Additionally, as best shown in FIG. 2, the driven shell 42 includes a circumferential interruption 90 in the axially outer end 64 and that may include circumferentially facing edges 92 and an axially facing shoulder 94. The axially facing shoulder 94 may extend axially beyond the drive shell axially outer end 56 (FIG. 3). The circumferential interruption 90 also may include a circumferentially extending notch 96 (FIG. 3) for a portion of the thread adapter in one of the circumferentially facing edges 92 and axially located between the axially facing shoulder 94 and the driven shell axially outer end 64. The circumferential interruption 90 extends circumferentially between 10 and 60 angular degrees including all ranges, sub-ranges, values, and end-points of that range. The circumferential interruption 90 may, however, only extend circumferentially between 0 and 10 angular degrees including all ranges, sub-ranges, values and endpoints of that range. Thus, in at least some embodiments, the circumferential interruption 90 may extend circumferentially only to the extent necessary to accommodate passage of a corresponding portion of the thread adapter 44 to fit therethrough.

Figures 4, 5:
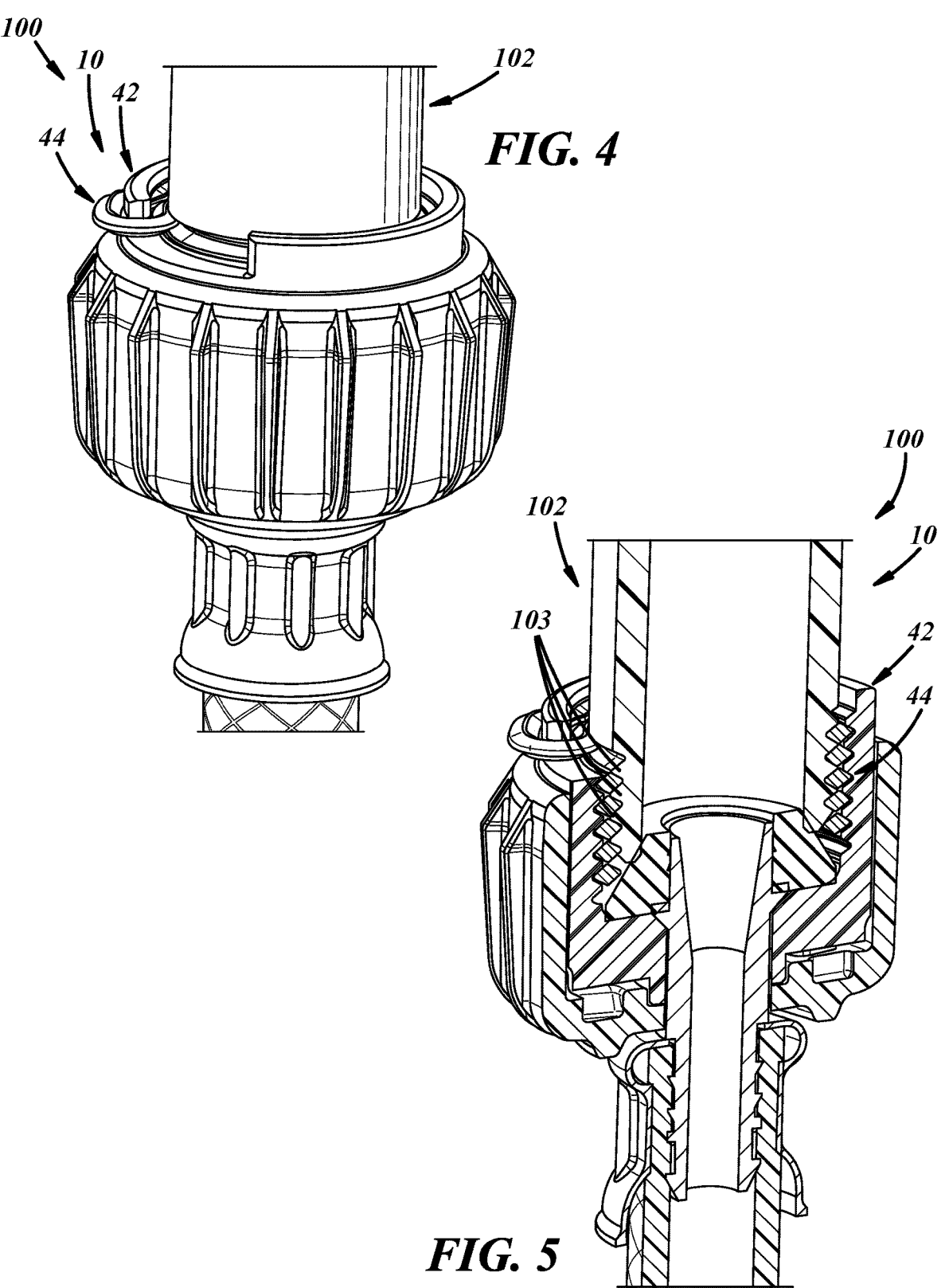
FIG. 4 is an enlarged, fragmentary, perspective view of a first fluid coupling assembly including the first plumbing product shown in FIG. 1 and a second plumbing product threaded to the first plumbing product shown in FIG. 1.
FIG. 5 is a perspective, longitudinal cross-sectional view of the first fluid coupling assembly shown in FIG. 4.

With reference to FIGS. 4 and 5, a fluid coupling assembly 100 includes the universal fluid connector 10 shown in FIGS. 1 through 3 and, additionally, a second plumbing product 102 threaded to the universal fluid connector 10. As shown in FIG. 5, the second plumbing product 102 may include a faucet inlet that may be a tube or pipe made of brass or other metal having a first thread 103, for example, a ½"-14 male thread. In any case, the first thread of the faucet inlet is threaded directly to the thread adapter 44 and is not directly threaded to the driven shell 42.

With reference now to FIGS. 6 through 8, the universal fluid connector 10 of FIG. 1 is illustrated, but without the thread adapter (not shown) so as to accommodate coupling to a different product. More specifically, and with reference to FIGS. 9 and 10, a fluid coupling assembly 104 includes the universal fluid connector 10 shown in FIGS. 6 through 8 and, additionally, a third plumbing product 105 threaded to the universal fluid connector 10. In a plumbing product example, the third plumbing product 105 may include a toilet inlet that may be a tube or a pipe made of plastic and threaded with a second thread 106, different from the first thread 103 of the second plumbing product 102, for instance, a male ⅞" ballcock thread, which has the same 14 threads per inch pitch as many faucet inlets.

FIGS. 11 and 12 illustrate another illustrative embodiment of a universal fluid connector 110. This embodiment is similar in many respects to the embodiment of FIGS. 1-10. Accordingly, the descriptions of the embodiments are hereby incorporated into one another, and description of subject matter common to the embodiments generally may not be repeated.

With reference now to FIG. 11, the universal fluid connector 110 is in the form of a plumbing product including a braided hose 118, a barb and seal hose connector 128, a universal nut 114 trapped between the braided hose 118 and the barb and seal hose connector 128, and a ferrule 130 crimped around the braided hose 118 to the connector 128. Unlike the torque-limiting universal nut 14 of the embodiment of FIG. 1, here, the universal nut 114 does not include both a driven shell and a drive shell and, instead, includes a unitary shell 138 rotatable about a central longitudinal axis 140. In that way, the universal nut 114 is like a standard universal nut but may include additional non-standard features as disclosed herein. A wire coil thread insert or adapter 144 is carried directly by the unitary shell 138.

As better shown in FIG. 12, the unitary shell 138 includes a shell base wall 146, and a shell skirt 148 extending axially away from the shell base wall 146. An interior of the shell skirt includes an internal thread 150, and an exterior of the shell skirt may include grip wings 154 extending radially outwardly therefrom.

With reference again to FIG. 11, the thread adapter 144 is threaded directly to the internal thread 150 (FIG. 12) of the unitary shell 138. Also, the thread adapter 144 may be elastically resilient, for example, spring-like, in that the adapter 144 can compress when installed into a female thread. The thread adapter 144 may include a single strip of material having a plurality of helical convolutions 170 unconnected at axially adjacent edges (not shown) thereof. The adapter 144 also may include an axially outboard end 180 terminating outside of an outer circumference (not shown), wherein the end 180 may include a hook 182 that may extend radially outwardly, and may include a bight portion 184, a connecting portion 186 connecting the bight portion 184 to a first of the plurality of helical convolutions 170, and a free portion 188 extending away from the bight portion 184 and spaced radially outwardly from the plurality of helical convolutions 170. The free portion 188 may include a straight or curvate leg 197 and a curved foot 198 that may extend back toward the skirt 148 of the shell 138 and may even contact the skirt 138. Accordingly, the end of the adapter 144 may include a tool-engaging feature, as will be described in further detail herein below.

FIGS. 13 through 16 illustrate another illustrative embodiment of a universal fluid connector 210. This embodiment is similar in many respects to the embodiments of FIGS. 1-12. Accordingly, the descriptions of the embodiments are hereby incorporated into one another, and description of subject matter common to the embodiments generally may not be repeated.

With reference now to FIG. 13, a universal fluid connector 210 is in the form of a plumbing product including a braided hose 218, a barb and seal hose connector 228, a torque-limiting universal nut 214 trapped between the braided hose 218 and the barb and seal hose connector 228, and a ferrule 230 crimped around the braided hose 218 to the connector 228. The torque-limiting universal nut 214 includes a drive shell 238, and a driven shell 242 carried by the drive shell 238, and a thread adapter 244 carried by the driven shell 238.

With reference now to FIG. 14, a tool in the form of a flat-blade screwdriver 200 is shown with a tip of the screwdriver 200 inserted between a hook 282 of the thread adapter 244 and a radially outer surface of the nut 242.

With reference now to FIG. 15, the screwdriver 200 is pivoted and pulled axially away from the nut 242 so as to pull the thread adapter 244 out of the nut 242 wherein the adapter 244 uncoils from the nut 242. In other embodiments, other tools could be used to pull the thread adapter out of the nut, for example, pliers. In any event, the hook 282 serves as a tool-engaging feature.

With reference now to FIG. 16, the thread adapter 244 has been uncoiled and completely removed from the nut 242. The process of removing the adapter 244 from the nut 242 takes only one to two seconds. Also, the adapter 244, once removed, is non-replaceable into the nut 242. As used herein, the term non-replaceable means that the adapter 244, in its uncoiled and removed state, cannot be replaced into the nut 242, at least not without recoiling the adapter via a manufacturing operation or some special techniques not ordinarily within the grasp of a homeowner consumer or other typical user of the product.

The non-replaceability is considered a feature of the product. This is because it would be undesirable for the nut internal threads to be threaded directly to some other threaded component and then have those same nut internal threads, which may be damaged or worn, to be threaded to an adapter. With conventional adapters, such an action might lead to leakage via the damaged or worn internal threads.

Moreover, contrary to conventional wisdom in the art of fluid connectors, the presently disclosed apparatus does not include the typical heavy, custom-designed, solid cylindrical, axially continuous adapters of the prior art. Instead, the presently disclosed apparatus may provide a lighter, simpler, and/or less-costly alternative to such prior adapters.

As mentioned at the outset, the presently disclosed innovations can be adapted for use with plumbing products. Using a metal or polymeric thread adapter with the universal nut would allow the nut to engage properly with threads of a metal faucet inlet and the mating metal or polymeric threads of the thread adapter would be much less prone to stripping out than traditional plastic nuts of typical faucet connectors. It is easy to cross thread conventional universal nuts composed of plastic onto male faucet stubs composed of brass. Conversely, using the presently disclosed adapter makes it more difficult to cross thread because the adapter is able to float somewhat and provide enough "give" so that the presently disclosed connector pilots more easily to the faucet stubs. The thread adapter also may be superior at evenly transferring loads from the universal nut threads to faucet threads than a conventional thread adapter made from a solid axially uninterrupted sleeve with threads on the inside and the outside. The thread adapter may made from coiled wire or reinforced polymer and thus may be lighter and less costly than a solid axially uninterrupted sleeve thread adapter. Moreover, it may take a user less than a couple seconds to remove the thread adapter from the plastic driven shell, for example, using a flat screwdriver to remove the adapter. Finally, when the driven shell is made from plastic it may also mate effectively with the typical plastic toilet inlet with less chance of damaging toilet inlet threads during install or loosening after install. This is because effects of temperature swings on the threaded joint are lessened because both the male and female threaded components may be made of similar (plastic) materials with similar coefficients of thermal expansion.

FIGS. 17 and 18 show an illustrative embodiment of a universal fluid connector 10' in the form of a plumbing product including a conduit 12' and one or more universal nuts 14' circumscribing the conduit 12'. The universal nuts 14' may be standard universal nuts and may be configured for use with the presently disclosed adapters of the embodiments of FIGS. 1 through 16. The conduit 12' extends along a conduit axis 16' and includes a tubing portion 18' and a nut coupling portion 20'. In this embodiment, the tubing portion 18' terminates in an enlarged open end 22' (FIG. 18) with a sealing portion 24', and the nut coupling portion 20' includes a nut locating shoulder 26' (FIG. 17) that may be located axially between the sealing portion 24' and the tubing portion 18'. Also in this embodiment, the conduit 12' is a unitary component composed of cross-linked polyethylene, and the enlarged open end 22' may include a cylindrical flange 28' (FIG. 18) between the sealing portion 24' and the tubing portion 18', and the sealing portion 24' may be frustoconical.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. As used herein, the term "may" is an expedient merely to indicate optionality, for instance, of an element, feature, or other thing, and cannot be reasonably construed as rendering indefinite any disclosure herein. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Features of various implementing embodiments may be combined to form further embodiments of the invention. Therefore, the claimed invention is not limited to the particular examples of illustrative embodiments disclosed herein but, instead, is defined by one or more of the accompanying claims.

The invention claimed is:

1. A universal fluid connector, comprising:
a conduit extending along a conduit axis and including a tubing portion and a nut coupling portion; and
a universal nut, including at least one shell, including a base wall coupled to the nut coupling portion of the conduit and having a conduit aperture through which the conduit extends, and a skirt extending axially away from the base wall and having an internal thread, and a thread adapter threaded to the internal thread of the skirt of the at least one shell, wherein the thread adapter includes a single strip of material having a plurality of helical convolutions unconnected at axially adjacent edges thereof, includes inner and outer circumferences, an axially inboard end terminating within the inner and outer circumferences, and an axially outboard end terminating outside of the outer circumference and including a hook extending radially outwardly.

2. The universal fluid connector of claim 1, wherein the universal nut does not include a separate driven shell carried by a separate drive shell.

3. The universal fluid connector of claim 1, wherein the universal nut is a torque-limiting universal nut, wherein the at least one shell includes a drive shell, including a drive shell base wall, and a drive shell skirt extending axially away from the drive shell base wall; and a driven shell carried by the drive shell, and including the base wall, the skirt with the internal thread, and the thread adapter threaded to the internal thread of the skirt of the driven shell.

4. The universal fluid connector of claim 3, wherein the drive shell and the driven shell are composed of plastic and the thread adapter is composed of metal.

5. The universal fluid connector of claim 3, wherein the drive shell and the driven shell are composed of plastic and the thread adapter is composed of a reinforced polymer.

6. The universal fluid connector of claim 1, wherein the thread adapter is elastically resilient.

7. The universal fluid connector of claim 1, wherein the single strip of material is rhombic or rhombus-shaped in cross section.

8. The universal fluid connector of claim 1, wherein the hook of the axially outboard end includes a bight portion, a connecting portion connecting the bight portion to a first of the plurality of helical convolutions, and a free portion extending away from the bight portion and spaced radially outwardly from the plurality of helical convolutions.

9. The universal fluid connector of claim 3, wherein the drive shell skirt has exterior knurling.

10. The universal fluid connector of claim 3, wherein the drive shell includes a drive shell axially outer end and the driven shell includes a driven shell axially outer end extending axially beyond the drive shell axially outer end.

11. The universal fluid connector of claim 10, wherein the driven shell has a circumferential interruption including circumferentially facing edges and an axially facing shoulder.

12. The universal fluid connector of claim 11, wherein the axially facing shoulder extends axially beyond the drive shell axially outer end.

13. The universal fluid connector of claim 1, wherein the skirt of the at least one shell includes an axially outer end with a circumferential interruption including circumferentially facing edges and an axially facing shoulder.

14. The universal fluid connector of claim 13, wherein the circumferential interruption also includes a circumferentially extending thread adapter notch in one of the circumferentially facing edges and axially located between the axially facing shoulder and the axially outer end of the at least one shell.

15. The universal fluid connector of claim 13, wherein the circumferential interruption extends circumferentially between 10 and 60 angular degrees.

16. The universal fluid connector of claim 13, wherein the circumferential interruption extends circumferentially between 0 and 10 angular degrees.

17. The universal fluid connector of claim 1, wherein the conduit extends along a conduit axis and includes a tubing portion and terminates in an open end with a sealing portion and a nut locating shoulder axially between the sealing portion and the tubing portion.

18. The universal fluid connector of claim 17, wherein the conduit is a unitary component.

19. The universal fluid connector of claim 18, wherein the conduit is composed of cross-linked polyethylene.

20. The universal fluid connector of claim 17, wherein the conduit further includes a connector portion with a cylinder fit to the open end of the conduit and a seal coupled to the cylinder, and a ferrule that is crimped around the open end of the conduit to the connector portion and that axially traps the base wall of the universal nut between the ferrule and the connector portion.

21. A first fluid coupling assembly and a second fluid coupling assembly, comprising:

the universal fluid connector of claim 1, a second threaded component having a first thread threaded to the thread adapter of the universal nut to constitute the first fluid coupling assembly, and a third threaded component having a second thread, different from the first thread, threaded directly to the internal thread of the universal nut to constitute the second fluid coupling assembly.

22. A universal fluid connector, comprising a conduit extending along a conduit axis and including a tubing portion and a nut coupling portion; and a universal nut, including at least one shell, including a base wall coupled to the nut coupling portion of the conduit and having a conduit aperture through which the conduit extends, and a skirt extending axially away from the base wall and having an internal thread, and an elastically resilient thread adapter threaded to the internal thread of the skirt of the at least one shell, configured as a single strip of material having a plurality of helical convolutions unconnected at axially adjacent edges thereof, and including inner and outer circumferences, an axially inboard end terminating within the inner and outer circumferences, and an axially outboard end terminating outside of the outer circumference and having a hook.

* * * * *